Patented June 28, 1938

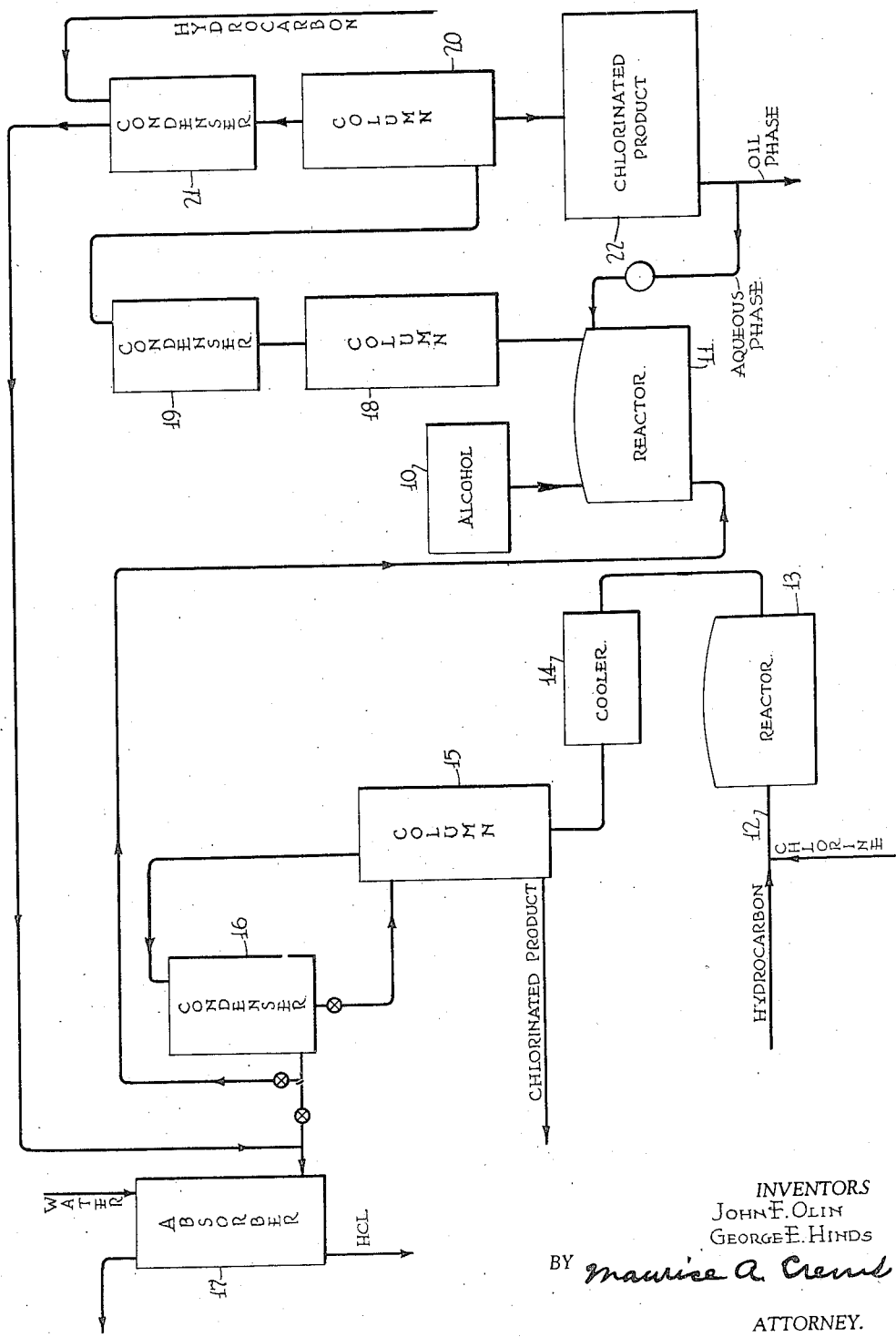

2,122,110

UNITED STATES PATENT OFFICE 2,122,110

HALOGENATION OF ALIPHATIC ALCOHOLS

John F. Olin and George E. Hinds, Grosse Ile, Mich., assignors to The Sharples Solvents Corporation, Philadelphia, Pa., a corporation of Delaware Application March 8, 1937, Serial No. 129,545

15 Claims. (Cl. 260—162)

The present invention pertains to the art of chlorination and was conceived in connection with research on the problem of converting alcohols into corresponding chlorides by reacting the alcohols with hydrogen chloride. The invention is particularly concerned with the development of a technique by which yields may be improved and separation problems minimized in connection with operations of this character.

In the practice of a process of this character, it is common practice to bubble gaseous hydrogen chloride through a body of the heated alcohol. In order to obtain a high yield of the chlorinated product it is necessary to pass a molecular excess of hydrogen chloride through the reactor, and unreacted hydrogen chloride must, of course, be separated from the chlorinated reaction product and water formed in the reaction. Objects of the invention have been to conduct the chlorination step and the ensuing step of separation in such a manner as to improve upon the efficiency of the separation attained as compared to that attained in prior art processes. To this end, features of the invention relate to introduction of a low boiling hydrocarbon together with the hydrogen chloride into the chlorinating reaction and the maintenance of a hydrocarbon reflux in connection with the fractionation of hydrogen chloride from the resultants of the reaction. Another feature of the invention consists in the utilization in the chlorination reaction of a mixture of a hydrocarbon and hydrogen chloride resulting from the chlorination of other hydrocarbon material.

The invention will be best understood by reference to the attached flow sheet, in which the single figure constitutes a diagrammatic illustration of the performance of the steps of the process.

The invention was conceived in connection with research upon the problem of converting butyl alcohol into butyl chloride by bubbling hydrogen chloride through a body of butyl alcohol maintained in the liquid phase. It will therefore be described with reference to that problem although the details of the invention have a much wider application than this specific operation as will be pointed out hereafter.

A body of butyl alcohol is first passed from the container 10 to a reactor 11. This body of alcohol is treated with hydrogen chloride by bubbling the gaseous hydrogen chloride through the body of liquid alcohol from the reactor 11 while heating that alcohol to a temperature of approximately 100° C.

An important feature of the invention consists in the nature of the gaseous mixture with which the alcohol is treated in the reactor 11. This material is obtained in accordance with the preferred embodiment of the invention in the following manner:

A body of mixed pentanes of the character described in the patent to Ayres 1,831,474 is chlorinated in accordance with the procedure described in that patent. Thus, the pentanes and chlorine are passed into confluence in vapor phase into a conduit 12 and are passed together through a heated reactor 13 to produce a mixture of amyl chlorides. This mixture is cooled at 14 and is fractionated in the rectifying column 15 to separate the amyl chlorides from unreacted hydrocarbon and hydrogen chloride. The mixture of unreacted hydrocarbon and hydrogen chloride is passed to condenser 16 where the bulk of pentanes is condensed and refluxed to the column 15. Hydrogen chloride containing a substantial proportion of pentanes is passed from condenser 16 to reactor 11. A part of the mixture of these materials passing from the condenser 16 may be passed to the reactor 11 and another part to a separating chamber 17 in which water is passed in counter-current direction with respect to the mixture of hydrogen chloride and pentane and thus absorbs the hydrogen chloride as indicated in the flow sheet and described in the above mentioned Ayres patent with respect to the absorber 24 of that patent. The mixture of hydrogen chloride and pentane discussed above is passed in vapor phase through the reactor 11 and this reactor is maintained at a temperature of approximately 100° C. during the course of the reaction. The hydrogen chloride reacts with the butyl alcohol in accordance with the following equation:

$$HCl + C_4H_9OH \rightarrow C_4H_9Cl + H_2O$$

A vapor phase mixture consisting of butyl alcohol, butyl chloride, water, pentane and hydrogen chloride passes from the reactor 11 to the column 18. A condenser 19 is maintained at a temperature between 78 and 80° C. thus allowing butyl chloride, pentane and hydrogen chloride and some butyl alcohol to be passed overhead while effecting a reflux of most of the butyl alcohol and water.

A mixture containing butyl chloride, pentane, hydrogen chloride and a small amount of water and butyl alcohol passes overhead to column 20. Gases are passed from this column to a highly efficient condenser 21 maintained at a sufficiently low temperature to obtain a reflux of the pentane. A further quantity of pentane or other low boiling hydrocarbon may also be introduced into the top of the column 21 to obtain a larger volume of refluxed material. Alternatively, pure hydrogen chloride may be used in the chlorination reaction in reactor 11 in case reflux hydrocarbon is introduced into the top of column 21. The effect of the maintenance of the reflux of a low boiling hydrocarbon such as pentane in the column 20 is to prevent the passage of butyl chloride with hydrogen chloride through the condenser 21. A very efficient separation of these two constituents is thus obtained and a mixture of pentane, butyl alcohol, butyl chloride and water containing a small amount of hydrogen chloride falls to the receiver 22. This mixture separates into a lower aqueous phase containing butyl alcohol, butyl chloride and water and an upper phase containing pentane and butyl chloride. The mixture of pentane and butyl chloride may be returned to the reactor 11, with or without further purification, as indicated in the flow sheet.

It will be noted from the above description that the use of a mixture of pentane with hydrogen chloride in the reactor 11 and the maintenance of a hydrocarbon reflux in condenser 21 enable us to obtain a degree of separation of the chlorinated reaction product from the hydrogen chloride passing from the process which could not be otherwise obtained.

The mixture of hydrogen chloride and pentane passing upwardly from condenser 21 is passed to the hydrogen chloride absorption step 17 of the pentane chlorination process together with the same mixture of pentane and hydrogen chloride which may pass directly from the condenser 16 to the water absorption step 17.

While the invention has been described specifically with reference to chlorination of butyl alcohol and uses of pentane in connection with such chlorination, it will be understood that it may be applied to the halogenation of any alcohol by means of a mixture of hydrogen halide and a hydrocarbon having a boiling point substantially lower than the halide to be produced.

Still further modifications will be obvious to those skilled in the art and we do not wish to be limited except by the scope of the subjoined claims.

We claim:

1. A process of producing a halogen derivative of a hydrocarbon compound comprising contacting an alcohol under reaction conditions with a mixture of hydrogen halide and a saturated hydrocarbon compound having a boiling point lower than the desired halogen derivative and thereafter separating hydrogen halide from the hydrocarbon halide by fractionation while maintaining a reflux of the low boiling hydrocarbon.

2. A process of producing a halogen derivative of a saturated aliphatic hydrocarbon compound comprising contacting a hydroxy derivative of the hydrocarbon compound under reaction conditions with a mixture of hydrogen halide and a saturated hydrocarbon compound having a boiling point lower than the desired halogen derivative and thereafter separating hydrogen halide from the hydrocarbon halide by fractionation while maintaining a reflux of the low boiling hydrocarbon.

3. A process of producing a halogen derivative of a hydrocarbon compound comprising contacting an alcohol under reaction conditions with a mixture of hydrogen halide and a hydrocarbon compound that will not substantially enter the reaction and having a boiling point lower than the desired halogen derivative and thereafter separating hydrogen halide from the hydrocarbon halide by fractionation while maintaining a reflux of the low boiling hydrocarbon.

4. A process of producing a halogen derivative of a saturated aliphatic hydrocarbon compound comprising contacting a hydroxy derivative of the hydrocarbon compound under reaction conditions with a mixture of hydrogen halide and a hydrocarbon compound that will not substantially enter the reaction and having a boiling point lower than the desired halogen derivative and thereafter separating hydrogen halide from the hydrocarbon halide by fractionation while maintaining a reflux of the low boiling hydrocarbon.

5. A process of producing a halogen derivative of a hydrocarbon compound comprising passing a vapor phase mixture of hydrogen halide and a saturated hydrocarbon compound having a boiling point lower than the desired halogen derivative through a body of an alcohol in liquid phase under reaction conditions and thereafter separating hydrogen halide from the hydrocarbon halide by fractionation while maintaining a reflux of the low boiling hydrocarbon.

6. A process of producing a halogen derivative of a hydrocarbon compound comprising passing a vapor phase mixture of hydrogen halide and a saturated aliphatic hydrocarbon compound having a boiling point lower than the desired halogen derivative through a body of an alcohol in liquid phase under reaction conditions and thereafter separating hydrogen halide from the hydrocarbon halide by fractionation while maintaining a reflux of the low boiling hydrocarbon.

7. A process of producing a halogen derivative of a hydrocarbon compound comprising halogenating a second hydrocarbon compound having a boiling point lower than the boiling point of the desired halogen derivative, removing the hydrocarbon halide resulting from halogenation of said second hydrocarbon compound from unreacted hydrocarbon and hydrogen halide resulting from the halogenation of said second hydrocarbon compound, thereafter contacting an alcohol under reaction conditions with the mixture of hydrogen halide and said second hydrocarbon compound produced as the result of the fractionation of hydrocarbon halide of said second hydrocarbon compound from the reaction mixture resulting from the halogenation thereof and thereafter separating by fractionation hydrogen halide from the hydrocarbon halide resulting from the halogenation of said alcohol while maintaining a reflux of the second hydrocarbon compound, said second hydrocarbon compound being one that will not substantially enter into the reaction with the hydrogen halide.

8. A process of producing a halogen derivative of a hydrocarbon compound comprising halogenating a second hydrocarbon compound having a boiling point lower than the boiling point of the desired halogen derivative, removing the hydrocarbon halide resulting from halogenation of said second hydrocarbon compound from unreacted hydrocarbon and hydrocarbon halide resulting from the halogenation of said second hydrocarbon compound, thereafter passing a vapor phase mixture of the hydrogen halide and second hydrocarbon compound produced as the result of the fractionation of hydrocarbon halide from said second hydrocarbon compound through a body of an alcohol in liquid phase under reaction conditions and thereafter separating by fractionation hydrogen halide from the hydrocarbon halide resulting from reaction of hydrogen halide with the alcohol while maintaining a reflux of the second hydrocarbon compound, said second hydrocarbon compound being one that will not substantially enter into the reaction with the hydrogen halide.

9. A process of producing a halogen derivative of a hydrocarbon compound comprising halogenating a second hydrocarbon compound having a boiling point lower than the boiling point of the desired halogen derivative, removing the hydrocarbon halide resulting from halogenation of said second hydrocarbon compound from unreacted hydrocarbon and hydrogen halide resulting from the halogenation of said second hydrocarbon compound, thereafter contacting an alcohol under reaction conditions with the mixture of hydrogen halide and said second hydrocarbon compound produced as the result of the fractionation of hydrocarbon halide of said second hydrocarbon compound from the reaction mixture resulting from the halogenation thereof, thereafter separating by fractionation hydrogen halide from the hydrocarbon halide resulting from the halogenation of said alcohol while maintaining a reflux of the second hydrocarbon compound, said second hydrocarbon compound being one that will not substantially enter into the reaction with the hydrogen halide, passing the mixture of hydrogen halide and said second hydrocarbon compound resulting from fractionation of the halide of said first hydrocarbon compound therefrom into confluence with a mixture of said second hydrocarbon compound and hydrogen halide resulting from the removal of hydrocarbon halide from the reaction mixture resulting from halogenation of said second hydrocarbon compound, and passing the mixture resulting from said confluence into contact with water to effect absorption of hydrogen halide therefrom.

10. A process of producing a halogen derivative of butane comprising halogenating pentane, removing amyl halide from the unreacted pentane and hydrogen halide resulting from the halogenation of said pentane, thereafter contacting butyl alcohol under reaction conditions with the mixture of hydrogen halide and pentane produced as the result of the fractionation of amyl halide from the reaction mixture resulting from the halogenation of said pentane and thereafter separating by fractionation hydrogen halide from the butyl halide resulting from the halogenation of said butyl alcohol while maintaining a reflux of pentane.

11. The process of producing butyl halide comprising halogenating pentane, removing amyl halide resulting from halogenation of said pentane from unreacted pentane and hydrogen halide resulting from said halogenation, thereafter passing a vapor phase mixture of hydrogen halide and pentane produced as the result of the fractionation of amyl halide from said pentane through a body of butyl alcohol in liquid phase under reaction conditions and thereafter separating by fractionation hydrogen halide from the butyl halide resulting from reaction of hydrogen halide upon said butyl alcohol while maintaining a reflux of pentane.

12. A process of producing a halogen derivative of a hydrocarbon compound comprising contacting an alcohol under reaction conditions with hydrogen halide, and thereafter separating hydrogen halide from the hydrocarbon halide produced by reaction of hydrogen halide upon said alcohol while maintaining a reflux of a hydrocarbon that will not substantially enter the reaction and having a boiling point lower than said hydrocarbon halide.

13. A process of producing a halogen derivative of a hydrocarbon compound comprising passing hydrogen halide in vapor phase through a body of an alcohol in liquid phase under reaction conditions and thereafter separating hydrogen halide from the hydrocarbon halide produced as the result of reaction of said hydrogen halide upon said alcohol by fractionation while maintaining a reflux of a hydrocarbon compound that will not substantially enter the reaction and having a boiling point lower than said hydrocarbon halide.

14. A process of producing a halogen derivative of a hydrocarbon compound comprising contacting an alcohol under reaction conditions with a mixture of hydrogen halide and a saturated hydrocarbon compound having a boiling point lower than the desired halogen derivative and thereafter separating hydrogen halide from the hydrocarbon halide by fractionation while maintaining a reflux of the low boiling hydrocarbon introduced with said hydrogen halide and of a further quantity of a hydrocarbon compound that will not substantially enter the reaction and having a boiling point lower than that of the hydrocarbon halide produced, said further quantity of hydrocarbon compound being separately introduced into the fractionating operation.

15. A process of producing a halogen derivative of a hydrocarbon compound comprising contacting an alcohol under reaction conditions with hydrogen halide and thereafter separating by fractionation hydrogen halide from the hydrocarbon halide produced as the result of reaction of said hydrogen halide upon the alcohol while introducing into the fractionating operation a reflux of a hydrocarbon that will not substantially enter the reaction and having a boiling point lower than said hydrocarbon halide.

JOHN F. OLIN.
GEORGE E. HINDS.